(12) United States Patent
Malloy et al.

(10) Patent No.: US 9,177,674 B2
(45) Date of Patent: Nov. 3, 2015

(54) COMPACT NUCLEAR REACTOR

(75) Inventors: John D. Malloy, Goode, VA (US); Mathew W. Ales, Forest, VA (US)

(73) Assignee: BWXT Nuclear Energy, Inc., Charlotte, NC (US)

(*) Notice: Subject to any disclaimer, the term of this patent is extended or adjusted under 35 U.S.C. 154(b) by 869 days.

(21) Appl. No.: 12/911,572

(22) Filed: Oct. 25, 2010

(65) Prior Publication Data

US 2012/0076254 A1 Mar. 29, 2012

Related U.S. Application Data

(63) Continuation-in-part of application No. 12/891,317, filed on Sep. 27, 2010.

(51) Int. Cl.
| | |
|---|---|
| *G21C 7/06* | (2006.01) |
| *G21C 1/08* | (2006.01) |
| *G21C 1/32* | (2006.01) |
| *G21C 7/08* | (2006.01) |

(52) U.S. Cl.
CPC .............. *G21C 1/086* (2013.01); *G21C 1/322* (2013.01); *G21C 7/08* (2013.01); *Y02E 30/32* (2013.01); *Y02E 30/39* (2013.01)

(58) Field of Classification Search
CPC .......... G21C 1/086; G21C 1/322; G21C 7/08; Y02E 30/32; Y02E 30/39
USPC ....................................................... 376/220
See application file for complete search history.

(56) References Cited

U.S. PATENT DOCUMENTS

| | | | |
|---|---|---|---|
| 3,150,051 | A | 9/1964 | Ammon |
| 3,165,449 | A | 1/1965 | Bradley |
| 3,437,559 | A | 4/1969 | Junkermann et al. |
| 3,547,084 | A | 12/1970 | Sprague |

(Continued)

FOREIGN PATENT DOCUMENTS

CA 674542 A 11/1963

OTHER PUBLICATIONS

Ishida et al., "Development of In-vessel Type Control Rod Drive Mechanism for Marine Reactor", Journal of Nuclear Science and Technology, vol. 38, No. 7, pp. 557-570 (Jul. 2001).*

(Continued)

*Primary Examiner* — Frank J McGue
(74) *Attorney, Agent, or Firm* — Nelson Mullins Riley & Scarborough, LLP

(57) ABSTRACT

A pressurized water nuclear reactor (PWR) includes a once through steam generator (OTSG) disposed in a generally cylindrical pressure vessel and a divider plate spaced apart from the open end of a central riser. A sealing portion of the pressure vessel and the divider plate define an integral pressurizer volume that is separated by the divider plate from the remaining interior volume of the pressure vessel. An internal control rod drive mechanism (CRDM) has all mechanical and electromagnetomotive components including at least a motor and a lead screw disposed inside the pressure vessel. Optionally CRDM units are staggered at two or more different levels such that no two neighboring CRDM units are at the same level. Internal primary coolant pumps have all mechanical and electromagnetomotive components including at least a motor and at least one impeller disposed inside the pressure vessel. Optionally, the pumps and/or CRDM are arranged below the OTSG.

12 Claims, 7 Drawing Sheets

(56) References Cited

U.S. PATENT DOCUMENTS

| | | | |
|---|---|---|---|
| 3,620,639 A | 11/1971 | Gaffal et al. | |
| 3,888,734 A | 6/1975 | Juric | |
| 3,915,654 A | 10/1975 | Oni et al. | |
| 3,955,856 A | 5/1976 | Wayson et al. | |
| 4,002,936 A | 1/1977 | Laing | |
| 4,045,283 A * | 8/1977 | Noyes et al. | 376/239 |
| 4,057,467 A | 11/1977 | Kostrzewa | |
| 4,072,563 A * | 2/1978 | McDonald et al. | 376/406 |
| 4,716,013 A | 12/1987 | Veronesi et al. | |
| 5,045,274 A * | 9/1991 | Donaldson | 376/318 |
| 5,053,190 A | 10/1991 | Gardner et al. | |
| 5,114,667 A | 5/1992 | Hayashi et al. | |
| 5,124,115 A | 6/1992 | Dillmann | |
| 6,259,760 B1 | 7/2001 | Carelli et al. | |
| 6,357,114 B1 * | 3/2002 | Tang et al. | 29/890.044 |
| 6,795,518 B1 | 9/2004 | Conway et al. | |
| 6,810,099 B2 | 10/2004 | Nakamaru et al. | |
| 6,813,328 B2 | 11/2004 | Kitch et al. | |
| 7,120,218 B2 | 10/2006 | Srinivasan | |
| 7,154,982 B2 | 12/2006 | Gautier et al. | |
| 2008/0115508 A1 | 5/2008 | Kotzot et al. | |
| 2010/0316181 A1 * | 12/2010 | Thome et al. | 376/372 |

OTHER PUBLICATIONS

International Search Report and Written Opinion for PCT/US2011/050741 dated Dec. 30, 2011.
First Office Action for Chinese Patent Application No. 201180004814.7 dated Jan. 29, 2015.
"The Iris Spool-Type Reactor Coolant Pump" by J. M. Kujawski, D. M. Kitch and L. E. Conway; Proceedings of ICONE10, 10th International Conference on Nuclear Engineering, Arlington, VA, Apr. 14-18, 2002.

* cited by examiner

Section D-D

COMPACT NUCLEAR REACTOR

This application is a continuation-in-part of application Ser. No. 12/891,317 filed Sep. 27, 2010 and titled "COMPACT NUCLEAR REACTOR WITH INTEGRAL STEAM GENERATOR".

BACKGROUND

The following relates to the nuclear reactor arts, steam generator and steam generation arts, electrical power generation arts, and related arts.

Compact nuclear reactors are known for maritime and land-based power generation applications and for other applications. In some such nuclear reactors, an integral steam generator is located inside the reactor pressure vessel, which has advantages such as compactness, reduced likelihood of a severe loss of coolant accident (LOCA) event due to the reduced number and/or size of pressure vessel penetrations, retention of the radioactive primary coolant entirely within the reactor pressure vessel, and so forth.

Disclosed herein are further improvements that provide reduced cost, simplified manufacturing, and other benefits that will become apparent to the skilled artisan upon reading the following.

BRIEF SUMMARY

In one aspect of the disclosure, an apparatus comprises: a generally cylindrical pressure vessel defining a cylinder axis; a nuclear reactor core disposed in the generally cylindrical pressure vessel; a central riser disposed coaxially inside the generally cylindrical pressure vessel, the central riser being hollow and having an end proximate to the nuclear reactor core to receive primary coolant heated by the nuclear reactor core and an open end distal from the nuclear reactor core discharging the primary coolant; a once through steam generator (OTSG) disposed in an annular volume defined between the central riser and the generally cylindrical pressure vessel, the primary coolant discharged from the open end of the central riser flowing through the OTSG and heating secondary coolant also flowing through the OTSG, the primary coolant and the secondary coolant being disposed in separate flow paths in the OTSG; and internal primary coolant pumps arranged to circulate primary coolant within the pressure vessel, the internal primary coolant pumps having all mechanical and electromagnetomotive components including at least a motor and at least one impeller disposed inside the pressure vessel.

In another aspect of the disclosure, an apparatus comprises: a pressurized water nuclear reactor (PWR) including a generally cylindrical pressure vessel defining a cylinder axis, a nuclear reactor core disposed in the generally cylindrical pressure vessel, and a hollow central riser disposed coaxially inside the generally cylindrical pressure vessel with an end proximate to the nuclear reactor core to receive primary coolant heated by the nuclear reactor core and an open end distal from the nuclear reactor core discharging the primary coolant; a once through steam generator (OTSG) disposed in the pressure vessel and including a primary coolant flow path and a secondary coolant flow path, primary coolant flowing in the primary coolant flow path heating secondary coolant flowing in the secondary coolant flow path to generate secondary coolant comprising steam; and a divider plate spaced apart from the open end of the central riser. The generally cylindrical pressure vessel includes a sealing portion cooperating with the divider plate to define an integral pressurizer volume that is separated by the divider plate from the remaining interior volume of the generally cylindrical pressure vessel. The integral pressurizer volume contains primary coolant at a pressure greater than a pressure of primary coolant disposed in the remaining interior volume of the generally cylindrical pressure vessel.

In another aspect of the disclosure, an apparatus comprises: a generally cylindrical pressure vessel defining a cylinder axis; a nuclear reactor core disposed in the generally cylindrical pressure vessel; a central riser disposed coaxially inside the generally cylindrical pressure vessel, the central riser being hollow and having an end proximate to the nuclear reactor core to receive primary coolant heated by the nuclear reactor core and an open end distal from the nuclear reactor core discharging the primary coolant; a once through steam generator (OTSG) disposed in an annular volume defined between the central riser and the generally cylindrical pressure vessel, the primary coolant discharged from the open end of the central riser flowing through the OTSG and heating secondary coolant also flowing through the OTSG, the primary coolant and the secondary coolant being disposed in separate flow paths in the OTSG; neutron absorbing control rods; and an internal control rod drive mechanism (CRDM) configured to controllably insert and withdraw the control rods into and out of the nuclear reactor core, the internal CRDM having all mechanical and electromagnetomotive components including at least a motor and a lead screw disposed inside the pressure vessel.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIG. 5 also shows the control rod drive mechanism (CRDM) units in a vertically staggered arrangement.

DETAILED DESCRIPTION OF THE PREFERRED EMBODIMENTS

Figure 1:
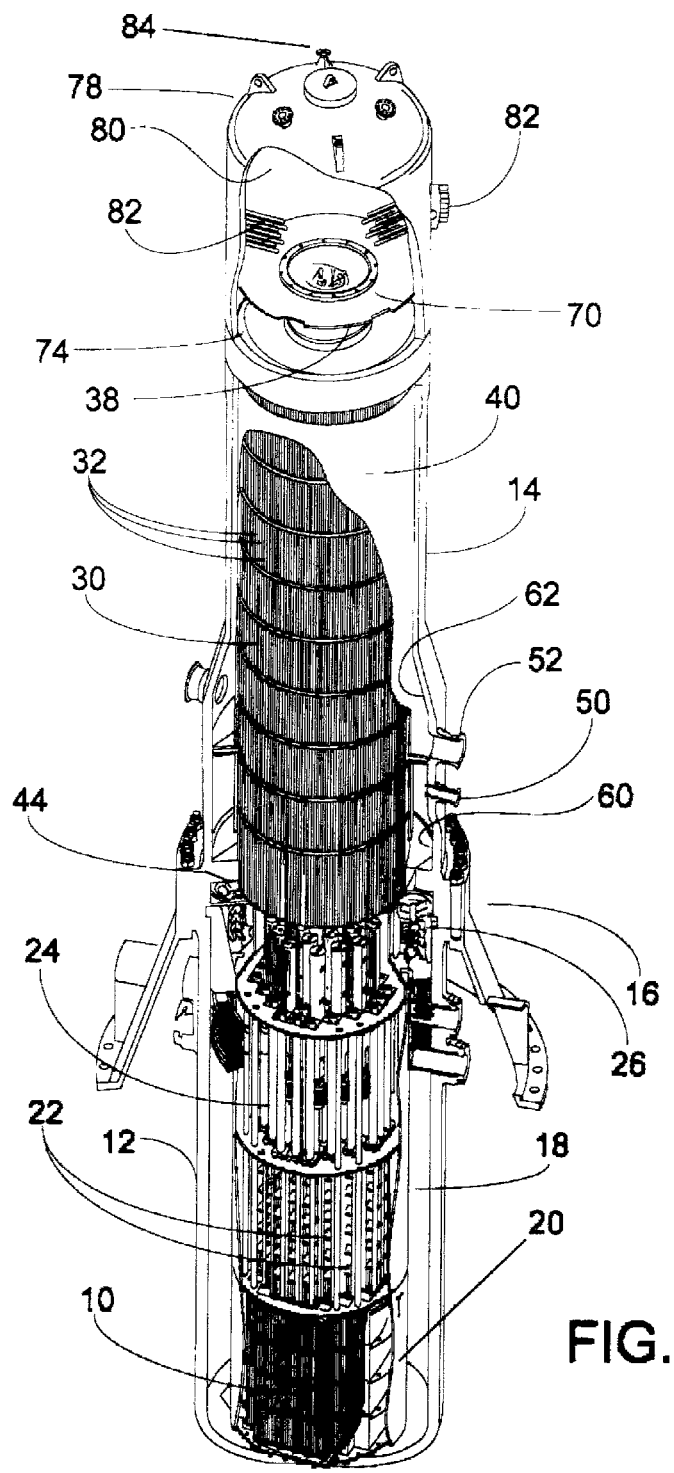
FIG. 1 diagrammatically shows a perspective partial sectional view of a nuclear reactor including an integral steam generator as disclosed herein.

With reference to FIG. 1, a perspective partial sectional view of a illustrative nuclear reactor is shown. A nuclear reactor core 10 is disposed inside a generally cylindrical pressure vessel. In the illustrative embodiment the pressure vessel includes a lower pressure vessel portion or section 12 housing the nuclear reactor core 10, an upper vessel portion or section 14, and mid-flange region 16. This is merely an illustrative configuration, and the pressure vessel can in general be constructed of as few as a single portion or section, or two portions or sections, three portions or sections (as illustrated), four portions or sections (for example including a fourth upper "cap" portion or section separate from the upper portion or section), or so forth. The pressure vessel 12, 14, 16 contains primary coolant, which in the illustrative case of a light water reactor is water ($H_2O$), optionally including other additives for reactivity control, such as a boron compound (e.g., "borated water"). In other contemplated embodiments the primary coolant may be another fluid, such as heavy water ($D_2O$). The primary coolant fills most or all of the volume of the pressure vessel 12, 14, 16. A reactor inlet annulus 18 surrounds the reactor core 10 to enable primary coolant to flow to the reactor core 10. Optional shielding or shrouding 20 disposed in the reactor inlet annulus 18 provides additional radiation shielding from the reactor core 10. The illustrative reactor is a pressurized water reactor (PWR) in which the primary coolant is sub-cooled light water maintained under an elevated pressure at a temperature below the boiling point (saturation temperature) at the operating pressure; however, a boiling water reactor (BWR) in which the primary coolant operates at the saturation temperature at an elevated pressure, or another reactor configuration such as a configuration employing heavy water, is also contemplated.

Reactor control is provided by upper internal neutron-absorbing control rods 22 and a control rod drive mechanism (CRDM) 24 that is configured to controllably insert and withdraw the control rods into and out of the nuclear reactor core 10. Diagrammatic FIG. 1 only identifies two illustrative control rods 22; however, in some embodiments the control rods may number in the dozens or hundreds, with insertion points spatially distributed across the reactor core area to collectively provide uniform reaction control. The CRDM 24 may be divided into multiple units, each controlling one or more control rods. For example, a plurality of control rods may be operatively coupled with a single CRDM unit via a connecting rod/spider assembly or other suitable coupling (details not illustrated). In some illustrative embodiments, a CRDM unit includes a motor driving a lead screw operatively connected with control rods via a connecting rod/spider assembly, such that motor operation causes linear translation of the assembly including the lead screw, connecting rod, spider, and control rods. Such CRDM units provide fine control of the precise insertion of the control rods into the reactor core 10 via the lead screw, and hence are suitable for "gray rod" operation providing fine incremental reaction control. In some illustrative embodiments, a CRDM unit may comprise a lifting piston that lifts an assembly including the connecting rod, spider, and control rods out of the reactor core 10, and during a SCRAM removes the lifting force to allow the control rods to fall into the reactor core 10 by gravity and optional hydraulic pressure force(s). Such CRDM units are suitably used for "shutdown rod" operation, as part of the reactor safety system. In yet other illustrative embodiments, the gray rod and shutdown rod functionality is integrated into a single CRDM unit, for example using a separable ball nut coupling with a lead screw such that the CRDM unit normally provides gray rod functionality but during a SCRAM the ball nut separates to release the control rods into the reactor core 10. Some further illustrative embodiments of CRDM units are set forth in application Ser. No. 12/722,662 titled "Control Rod Drive Mechanism for Nuclear Reactor" filed Mar. 12, 2010 and related application Ser. No. 12/722,696 titled "Control Rod Drive Mechanism For Nuclear Reactor" filed Mar. 12, 2010 are both incorporated herein by reference in their entireties. These applications disclose CRDM units providing gray/shutdown rod functionality, in which the connection between the motor and the lead screw is not releasable, but rather a separate latch is provided between the lead screw and the connecting rod in order to effectuate SCRAM. In these alternative configurations the lead screw does not SCRAM, but rather only the unlatched connecting rod and control rod SCRAM together toward the reactor core while the lead screw remains engaged with the motor.

The diagrammatically illustrated CRDM 24 may include one or more CRDM units including various combinations of CRDM units of the described types or other CRDM unit configurations providing gray and/or shutdown rod functionality. The illustrative CRDM 24 is an internal CRDM in which all mechanical and electromagnetomotive components, including the motor, lead screw, connecting rod, and so forth are disposed inside the pressure vessel 12, 14, 16, with only electrical wires, hydraulic lines, or other power or control leads connecting with these components. In other contemplated embodiments, the CRDM may employ external CRDM units in which the motor is mounted outside the pressure vessel, for example above or below.

With continuing reference to FIG. 1, the primary coolant may be circulated naturally, due to natural circulation set up by heating due of the primary coolant in the vicinity of the operating nuclear reactor core 10. Additionally or alternatively, the primary coolant circulation may be driven or assisted by optional reactor coolant pumps 26. The diagrammatically illustrated coolant pumps 26 are internal pumps having rotor and stator elements both located inside the pressure vessel 12, 14, 16. An advantage of the illustrated internal reactor coolant pumps 26 over external pumps or pumps employing an external motor (that is, in which the pump or the motor are located outside of the pressure vessel) is that the number, size, and complexity of vessel penetrations is substantially reduced. The only penetrations introduced by the internal reactor coolant pumps 26 are electrical feedthroughs, and these can be routed so as to minimize the likelihood and seriousness of a LOCA event. For example, the electrical lines can be routed upward so that the corresponding pressure vessel penetrations are at or near the top of the pressure vessel. Additionally or alternatively, if the electrical lines for driving the internal reactor coolant pumps 26 are bundled with other electrical lines such as those connecting with reactor core sensors or the like, then the internal reactor coolant pumps 26 do not introduce any additional pressure vessel penetrations.

Alternatively, an external pump can be employed, for example having an external stator and a rotor coupled with the pressure vessel volume via a suitable conduit or tube, or the circulation pumps may be omitted entirely, as per natural circulation reactor embodiments. The use of external pumps has the advantage of easier access for pump repair or replacement.

Figure 2:
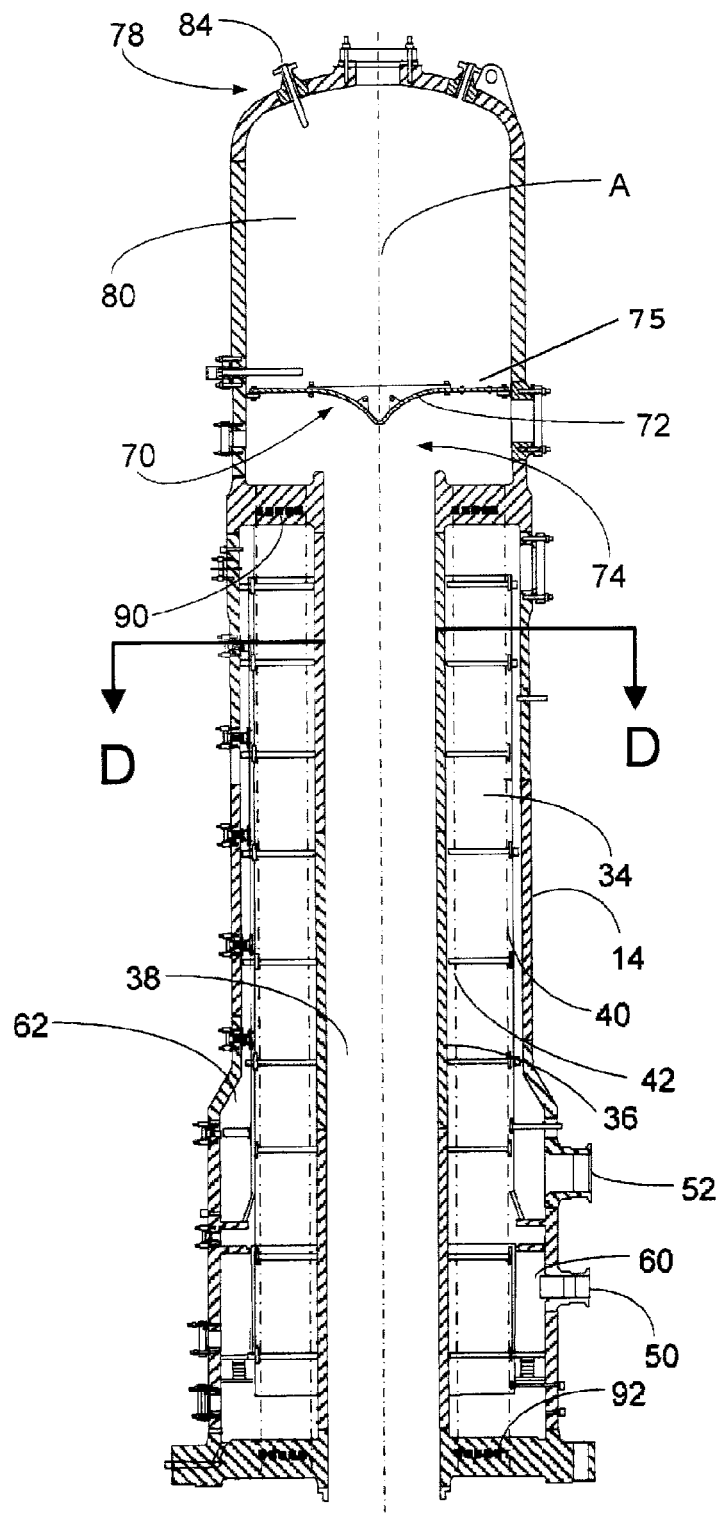
FIG. 2 diagrammatically shows a side sectional view of the upper vessel section of the nuclear reactor of FIG. 1 with the tubes of the steam generator omitted to emphasize the downcomer volume.
Figure 3:
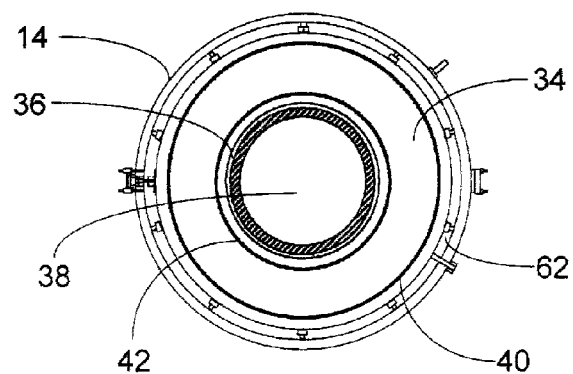
FIG. 3 diagrammatically shows Section D-D indicated in FIG. 2.

The nuclear reactor is further described with continuing reference to FIG. 1 and with further reference to FIGS. 2 and 3. FIG. 2 illustrates a side sectional view of the upper vessel 14 and selected components therein, while FIG. 3 shows Section D-D indicated in FIG. 2. As seen in FIG. 1, the illustrative nuclear reactor is an integral nuclear reactor, by which it is meant that a steam generator 30 is integrated inside the pressure vessel 12, 14, 16. In the illustrative example, the pressure vessel 12, 14, 16 is generally cylindrical and defines a cylinder axis A (labeled only in FIG. 2). The steam generator 30 is a straight-tube once-through steam generator (OTSG) 30 disposed in the upper vessel 14 above the CRDM 24, as seen in FIG. 1. The OTSG 30 includes straight tubes 32 arranged vertically in parallel with the cylinder axis A in an annular "downcomer" volume 34 defined between: (i) a hollow central riser 36 disposed coaxially in the upper portion 14 of the generally cylindrical pressure vessel, and (ii) the upper portion 14 of the generally cylindrical pressure vessel. The hollow central riser 36 defines a central riser flow path 38 inside the central riser 36. The OTSG 30 also includes an outer shroud 40 surrounding the tubes 32 disposed in the downcomer volume 34, and an inner shroud 42 disposed between the central riser 36 and the tubes 32. (Note that in FIGS. 2 and 3, the OTSG shrouds 40, 42 are shown and labeled, but the tubes 32 are omitted so as to more clearly show the annular downcomer volume 34 in FIGS. 2 and 3).

The primary coolant flow path in the illustrative reactor is as follows. The central riser 36 has a bottom end proximate to the nuclear reactor core 10 to receive primary coolant heated by the nuclear reactor core 10, and a top end distal from the nuclear reactor core 10. Primary coolant heated by the nuclear reactor core 10 flows upward through the central riser flow path 38 inside the central riser 36. At the top of the central riser 36 the primary coolant flow turns approximately 180° (that is, from flowing generally upward to flowing generally downward). The primary coolant enters the tubes 32 of the OTSG 30 and flows downward through the tubes 32. The primary coolant is discharged from the lower ends of the tubes 32 into a primary outlet plenum 44, which passes the primary coolant flow back to the reactor inlet annulus 18 and back to the reactor core 10. In the illustrative embodiment, the illustrated internal reactor coolant pumps 26 are located on the cold side below the steam generator 30. In some embodiments, the coolant pumps 26 drive the primary coolant flow. In some embodiments, the coolant pumps 26 provide assistance to natural circulation driving the primary coolant flow. In either case, the location of the coolant pumps 26 on the cold side below the steam generator 30 advantageously promotes flow of the cooled primary coolant through the complex approximately 180° turn as the primary coolant is redirected upward into the core 10. The placement of the primary coolant pumps 26 on the cold side below the steam generator 30 also reduces the temperature and thermal stress on the coolant pumps 26, thus further facilitating the use of internal reactor coolant pumps 26.

Figure 4:
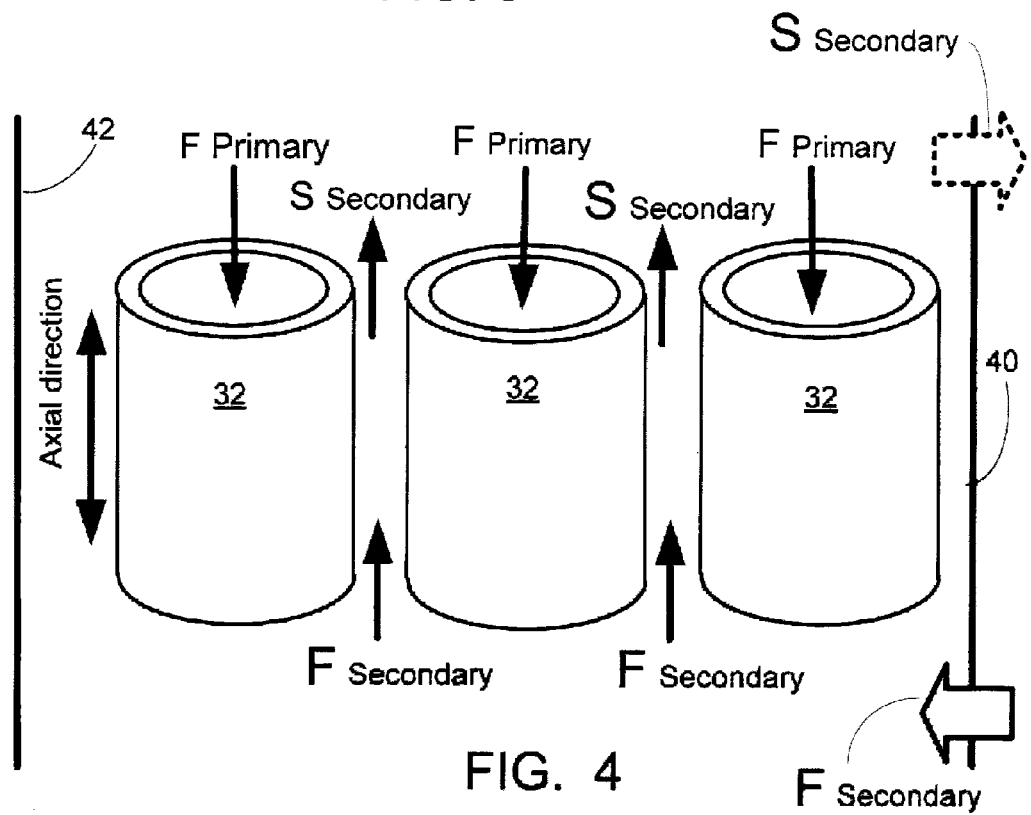
FIG. 4 diagrammatically shows flow of the primary and secondary coolant fluids in the integral steam generator of FIG. 1.

With continuing reference to FIGS. 1-3 and with further reference to FIG. 4, the outer and inner shrouds 40, 42 of the OTSG 30 define a fluid flow volume of the OTSG 30 between the shrouds 40, 42. This fluid flow volume surrounds the tubes 32, and has a feedwater inlet 50 and a steam outlet 52. Note that although a single inlet 50 and single outlet 52 are illustrated, in other embodiments there may be multiple inlets and/or multiple outlets, to provide redundancy and/or improved radial symmetry in the plane transverse to the axis A. Fluid (e.g., feedwater) is injected into the fluid flow volume at the feedwater inlet 50 and is discharged from the fluid flow volume (e.g., as steam) at the steam outlet 52. While in the fluid flow volume, the fluid flows outside the tubes 32 of the OTSG 30 in a generally upward direction generally opposite flow of primary coolant inside the tubes 32.

With continuing reference to FIGS. 1-3 and with further reference to FIG. 4, in the operating state of the illustrative PWR, feedwater injected into the fluid flow volume of the OTSG 30 at the feedwater inlet 50 is converted to steam by heat emanating from primary coolant flowing inside the tubes 32 of the OTSG 30, and the steam is discharged from the fluid flow volume at a steam outlet 52. This is diagrammatically shown in FIG. 4, which shows portions of three illustrative tubes 32 carrying downward primary coolant flow ($F_{primary}$). The fluid flow volume of the OTSG 30 is diagrammatically shown in FIG. 4 by indication of portions of the outer and inner shrouds 40, 42 that define the fluid flow volume of the OTSG 30. To facilitate correlation with FIGS. 1-3, the axial direction corresponding to the axis A of the generally cylindrical pressure vessel is also indicated in FIG. 4. The fluid flowing in the fluid flow volume of the OTSG 30 is sometimes referred to herein as "secondary" coolant, and the generally upward "counter" flow of the secondary coolant in the fluid flow volume of the OTSG 30 is indicated as secondary coolant flow ($F_{secondary}$) in diagrammatic FIG. 4. During the upward flow, heat emanating from the primary coolant flow $F_{primary}$ transfers to the secondary coolant flow $F_{secondary}$, causing the secondary coolant to heat until it is converted to secondary coolant flow having the form of steam flow ($S_{secondary}$). (The steam flow $S_{secondary}$ is also diagrammatically indicated in FIG. 4 by using dotted arrows). Although not illustrated, the steam flow $S_{secondary}$ exiting the steam outlet 52 suitably serves as working steam that flows to and operates a turbine or other steam-operated device.

In the illustrative embodiment, the fluid flow volume of the OTSG 30 is defined by the outer and inner shrouds 40, 42 that are separate from the central riser 36 and the upper portion 14 of the pressure vessel. Advantageously, this enables the OTSG 30 to be constructed as a unit including the tubes 32 and surrounding shrouds 40, 42, and to then be installed as a unit in the upper portion 14 of the pressure vessel. However, it is also contemplated for the inner shroud to be embodied as the outer surface of the central riser 36, and/or for the outer shroud to be embodied as an inner surface of the upper portion 14 of the pressure vessel.

In embodiments which include the outer shroud 40 which is separate from the upper pressure vessel portion 14 (as in the illustrative embodiment), an annular space between the outer shroud 40 and the pressure vessel 14 may optionally be employed for a useful purpose. In the illustrative example, the annular space between the outer shroud 40 and the pressure vessel 14 defines a feedwater annulus 60 between an outer shroud 40 of the OTSG 30 and the pressure vessel (upper portion 14) buffers feedwater injected into the fluid flow volume at the feedwater inlet 50. Similarly, a steam annulus 62 between the outer shroud 40 of the OTSG 30 and the pressure vessel (upper portion 14) buffers steam discharged from the fluid flow volume at the steam outlet 52.

In some embodiments, the feedwater annulus and the steam annulus have equal inner diameters and equal outer diameters. In such embodiments the outer shroud and the relevant pressure vessel portion have constant diameters over the axial length of the annuluses. In the illustrative embodiment, however, the feedwater annulus 60 has a larger outer diameter than the steam annulus 62. This is obtained by increasing the diameter of the upper pressure vessel portion 14 surrounding the feedwater annulus 60 as compared with the diameter of the upper pressure vessel portion 14 surrounding the steam annulus 62. In the illustrative embodiment the diameter of the outer shroud 40 remains constant over the axial length of the annuluses 60, 62. This configuration allows a larger local inventory of water so that the time available for steam generator boil-off is relatively longer in the event of a loss-of-feedwater (LOFW) accident.

With reference to FIGS. 1 and 2, as already mentioned the flow circuit for the primary coolant includes an approximately 180° flow reversal as the primary coolant discharges from the central riser flow path 38 inside the central riser 36 and flows into the top ends of the tubes 32 of the OTSG 30. Optionally, a flow diverter 70 is provided to facilitate this flow reversal. The illustrative flow diverter 70 is disposed in the generally cylindrical pressure vessel 14 and has a flow diverting surface 72 facing the top end of the central riser that is sloped or (as illustrated) curved to redirect primary coolant discharged from the top end of the central riser 36 toward inlets of the tubes 32 of the OTSG 30. The flow diverter 70 is spaced apart from the top of the central riser 36 by a primary inlet plenum 74. At the lower end, the internal reactor coolant pumps 26 drive or assist the primary coolant flow as it makes another approximately 180° flow reversal to enter in an upward direction into the bottom of the reactor core 10.

Figure 5:
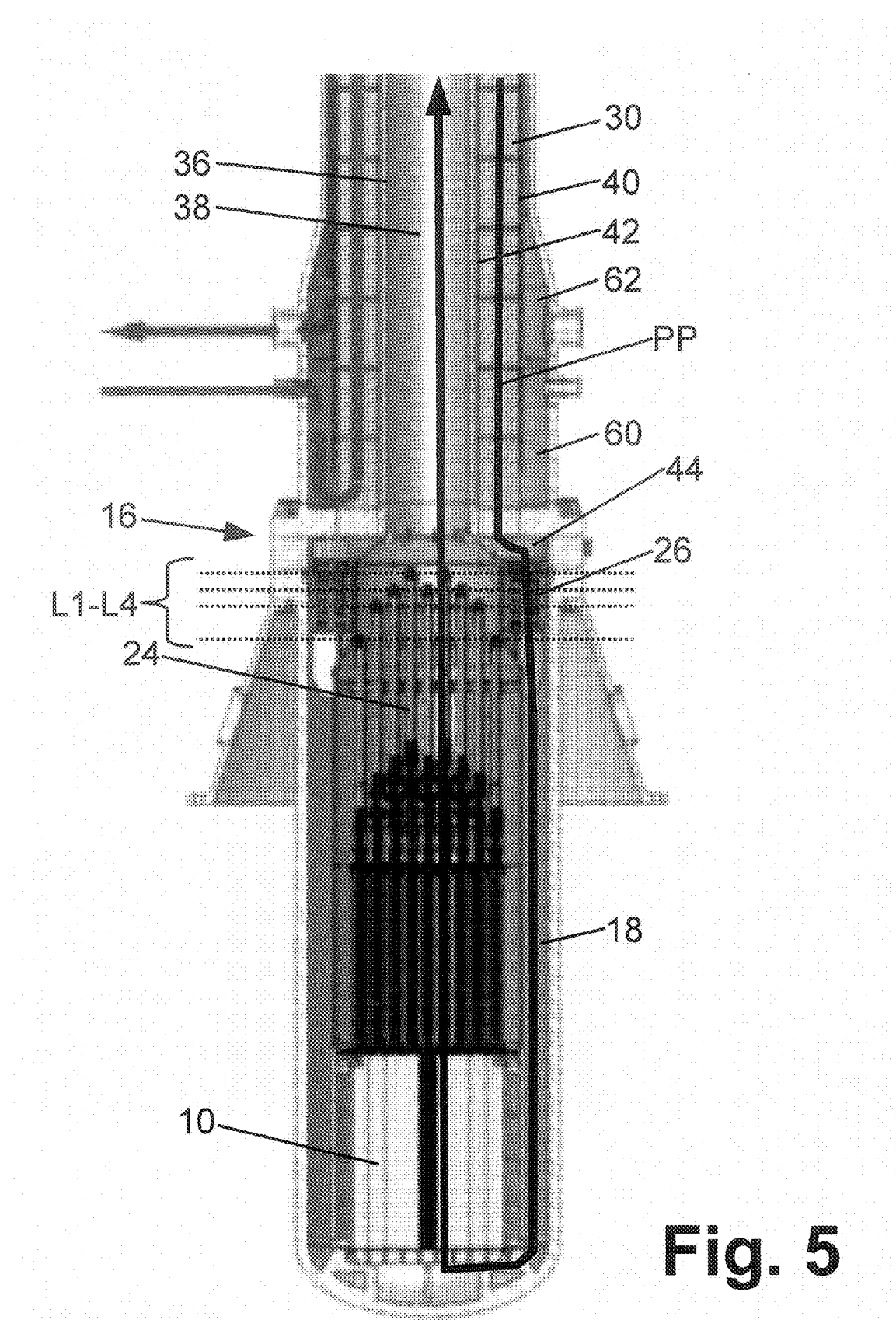
FIG. 5 diagrammatically shows an enlarged view of a lower portion of the pressure vessel of FIG. 1 with the primary coolant flow path diagrammatically superimposed.

With reference to FIG. 5, in some embodiments there are no fluid couplings between the coolant pumps 26 and individual tubes 32 of the steam generator 30. In these embodiments the pumps 26 drive primary coolant flow downward generally and act on a plurality of outlets of nearby steam generator tubes 32. In the illustrative example shown in FIG. 5, a diagrammatically indicate path PP shows the flow of the primary coolant in the lower portion of the pressure vessel. The primary coolant flow path PP discharges from the lower ends of the tubes 32 (not specifically shown in FIG. 5) of the steam generator 30 into the primary outlet plenum 44. The lower end of the feedwater annulus 60 terminates at in the mid flange region 16, which allows for the reactor inlet annulus 18 to reside at a larger radius than the steam generator 30. The primary outlet plenum 44 extends from the smaller radius of the steam generator 30 to the larger radius of the reactor inlet annulus 18 so as to provide a fluid connection from the primary coolant outlet of the steam generator 30 into the reactor inlet annulus 18. However, as seen in FIG. 5, the primary coolant flow path PP makes a relatively sharp dogleg in order to transition from the smaller radius of the steam generator 30 to the larger radius of the reactor inlet annulus 18. In the illustrative embodiment, this flow transition is facilitated by locating the internal reactor coolant pumps 26 at or near the top of the reactor inlet annulus 18 proximate to the primary outlet plenum 44. The fluid coupling for primary coolant from the outlet of the steam generator 30 to the inlets of the internal reactor coolant pumps 26 is therefore indirect via the primary outlet plenum 44.

Omitting fluid couplings between the steam generator and the coolant pumps facilitates independent maintenance of the steam generator 30 and the pumps 26. For example, during an opening of the pressure vessel the steam generator 30 can be removed from the pressure vessel while leaving the coolant pumps 26 intact and in place in the pressure vessel. Conversely, if suitable manways are provided for accessing the pumps 26, an individual coolant pump 26 can be removed or replaced while leaving both the steam generator 30 and the other coolant pumps 26 in intact and in place in the pressure vessel. Removal or replacement of either the steam generator 30 or one (or more) of the pumps 26 is also advantageously simplified since there are no steam generator/pump fluid couplings to disengage or engage.

Figure 6:
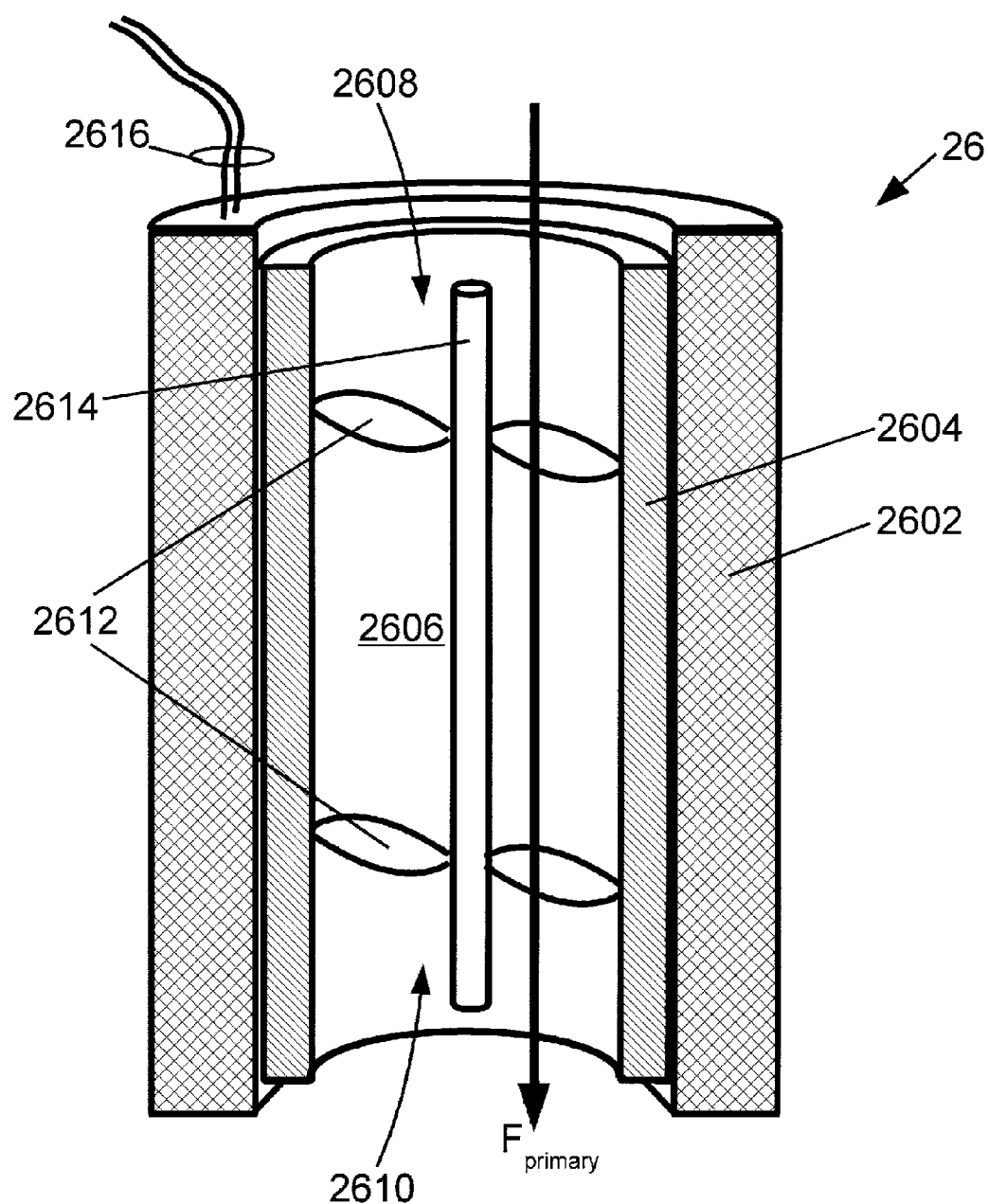
FIG. 6 diagrammatically shows a sectional perspective view of an illustrative embodiment of one of the internal primary coolant pumps.

With reference to FIG. 6, an illustrative embodiment of one of the internal primary coolant pumps 26 is diagrammatically shown in sectional perspective view. In general, the internal primary coolant pumps can be embodied by any self-contained pump that is robust against the environment inside the pressure vessel. Some suitable pumps include spool pumps. See, e.g., Kitch et al., U.S. Pat. No. 6,813,328. The illustrative pump 26 shown in FIG. 6 is a spool pump including a cylindrical pump stator 2602 containing a concentrically arranged cylindrical pump rotor 2604 defining a cylindrical central flow region 2606 through which primary coolant flow $F_{primary}$ is driven from an inlet 2608 to an outlet 2610. Impeller blades 2612 extend between the pump rotor 2604 and a central hub 2614 so that the assembly of the rotor 2604, impeller blades 2612, and hub 2614 rotate together inside the stator 2602. Alternatively, the impeller blades can be mounted on the hub alone with other couplings securing the hub with the rotor, or the impeller blades be mounted "single-ended" extending inwardly from the inner surface of the rotor into the flow region 2606. Annular groove/nub couplings between the rotor and stator or other couplings (not shown) prevent axial shifting of the rotor 2604 within the stator 2602 (that is, preventing shifting of the rotor 2604 along the direction of the primary coolant flow $F_{primary}$).

The stator 2602 and the rotor 2604 cooperatively define a motor imparting torque that turns the rotating assembly 2604, 2612, 2614. Substantially any motor design can be employed. In the illustrative example of FIG. 6, the stator 2602 is electrically driven via electrical power lines 2616 and includes suitable electrical conductor windings (not shown) of copper or another suitably electrically conductive and heat-resistant material, while the rotor 2604 can be suitably embodied as windings or other conductors that inductively interact with the stator 2602, or as a permanent magnet, or so forth. It is also contemplated to employ an electrically powered rotor. By way of illustrative example, the motor defined by the stator 2602 and the rotor 2604 may be a salient pole motor, a brushless DC motor, or so forth. The stator 2602 is preferably hermetically sealed so that the primary coolant does not contact windings. Alternatively, the stator can be unsealed and the primary coolant windings made of materials that are robust against exposure to the primary coolant. Similarly, the windings, conductors, or electromagnet of the rotor 2604 should be hermetically sealed and/or should be made of material or materials that are robust against exposure to the primary coolant.

Because the internal primary coolant pumps 26 are not coupled with the steam 30, the inlet 2608 and outlet 2610 of the pump 26 are not constrained to have any particular coupling connector or other particular configuration. In the illustrative pump 26 diagrammatically shown in FIG. 6, the inlet 2608 and outlet 2610 are maximally large, with radii constrained only by the inner diameter of the rotor 2604. This advantageously minimizes the fluid flow impedance. The lack of fluid coupling of the primary coolant pumps 26 with any particular component also facilitates maintenance or removal of the pump, as already noted. Yet another advantage of omitting fluid coupling with any particular component is that it provides flexibility in the number and size of internal primary coolant pumps included in the system. In spite of these advantages, if desired the inlet and/or outlet of the pumps can optionally have a particular configuration or coupling to facilitate and/or steer fluid flow. As yet another contemplated variation, a constriction of the outlet is optionally included to produce flow acceleration, or the cylindrical stator and rotor can be conical in order to provide primary coolant flow acceleration (if the cone is narrowing from inlet to outlet) or flow deceleration (if the cone is widening from inlet to outlet).

The placement of the illustrative internal primary coolant pumps 26 is advantageous for the illustrative embodiment, since it facilitates fluid flow through the dogleg at the primary outlet plenum 44. In other embodiments, a different placement of the internal primary coolant pumps may be advantageous. In general, because the internal coolant pumps 26 are not coupled with the steam generator or any other component, they can be placed anywhere in the primary coolant flow circuit. Placement in the cold leg, as illustrated, advantageously reduces operating temperature and thermal stress on the pumps 26; however, placement in the hot leg is also contemplated. Although not illustrated, placement higher up in the pressure vessel, for example in the central riser flow path 38 inside the central riser 36 (which would place the pumps in the hot leg of the primary coolant flow circuit), is also contemplated so as to improve accessibility of the pumps for maintenance or replacement. Still further, it is contemplated to place internal primary coolant pumps at various places in the primary coolant flow circuit—for example, the embodiment illustrated in FIG. 5 can be modified by retaining the illustrated pumps 26 located at or near the top of the reactor inlet annulus 18 proximate to the primary outlet plenum 44, and additionally include additional pumps located in the central riser 36.

As previously mentioned, the illustrative nuclear reactor is a pressurized water reactor (PWR) in which the primary coolant is sub-cooled and maintained under positive pressure. In some embodiments, the pressurization of the primary coolant is provided by an external pressurizer. However, in the illustrative embodiment the pressurization of the primary coolant is provided by an internal pressurizer. In this configuration, the flow diverter 72 also serves as a part of the divider plate 75 spaced apart from the top end of the central riser 36 by the aforementioned primary inlet plenum 74. The generally cylindrical pressure vessel 12, 14, 16 (and, more precisely, the upper pressure vessel portion 14) includes a sealing top portion 78 cooperating with the divider plate 75 to define an integral pressurizer volume 80 that is separated by the divider plate 75 from the remaining interior volume of the generally cylindrical pressure vessel 12, 14, 16. In the operating state of the PWR, the integral pressurizer volume 80 contains fluid (saturated primary coolant, liquid and steam) at a temperature that is greater than the temperature of the primary coolant disposed in the remaining interior volume of the generally cylindrical pressure vessel 12, 14, 16. In this embodiment, the saturation temperature is maintained by pressurizer heaters 82 (shown only in FIG. 1), while pressurizer spray nozzles 84 provide a mechanism for reducing the pressure by condensing some of the steam vapor in volume 80. The pressurizer heaters 82 may, for example, be electrical heaters. The divider plate 75 suitably includes openings (not shown) providing hydraulic fluid communication between the integral pressurizer volume 80 and the remaining interior volume of the generally cylindrical pressure vessel 12, 14, 16. This hydraulic fluid communication establishes the pressure level in the remaining interior volume of the generally cylindrical pressure vessel 12, 14, 16. Since there is a temperature difference across divider plate 75 between the pressurizer volume 80 and primary inlet plenum 74, the remaining primary fluid in the interior volume of the generally cylindrical pressure vessel 12, 14, 16 is maintained at sub-cooled liquid conditions at a temperature approximately 11° C. (20° F.) less than the saturation temperature in pressurizer volume 80. This level of sub-cooled liquid prevents the primary fluid in reactor core 10 from experiencing saturated bulk boiling which has a significantly higher vapor volume fraction than sub-cooled nucleate boiling typically present in pressurized water nuclear reactor cores. This prevention of bulk boiling in a PWR core is made possible by the pressurizer (80, 82, 84, 78, and 75) and is beneficial for the integrity of the nuclear reactor fuel rods by minimizing the probability of departure from nucleate boiling (DNB) which increases the fuel pellet and fuel cladding temperatures.

Having set forth an illustrative integral PWR as an illustrative example in FIGS. 1-6, some further additional aspects and variants are set forth next.

In one illustrative quantitative example, the reactor core 10 in the operating state operates at 425 MW thermal. The hot reactor coolant water flows in a circuit, called the hot leg, which includes the space above the core flowing around the CRDM's 24. The hot leg extends up the central riser 36 to the inlet plenum 74, wherein the reactor coolant subsequently enters into the tubes 32 of the straight-tube OTSG 30 via the central riser flow path 38. The straight-tube OTSG 30 encircles the central riser 36 and includes the annular array of steam generator tubes 32 disposed in the annulus between the central riser 36 and the outer shroud 40 of the OTSG 30. An advantage of this configuration is that the central riser 36 is a high pressure component separating the high pressure reactor primary coolant at 1900 psia (in this illustrative quantitative embodiment) from the lower pressure secondary coolant which in this example is at 825 psia. The use of an internal pressure part via the central riser 36 yields a compact and efficient design since the primary pressure boundary is internal to the steam generator 30 and serves the dual use as a riser defining the flow path 38 for the hot leg. One design consideration is that there is differential thermal expansion between central riser 36, the tubes 32, and the upper vessel 14. The differential expansion is further complicated by the feedwater annulus 60 containing feedwater at a substantially lower temperature than the steam in the steam annulus 62, which results in a range of temperatures in the upper vessel 14, causing additional thermal stress.

One approach for mitigating the effect of these differential stresses is to balance the stresses over the operational and non-operational range of conditions of the steam generator. In one illustrative example, the tubes 32 are made of an austenitic nickel-chromium-based alloy, such as Inconel™ 690, and the tubes 32 are secured in a support made of steel. The support includes an upper tubesheet 90 and a lower tubesheet 92 (diagrammatically indicated in FIG. 2). In general, the austenitic nickel-chromium-based alloy will have a higher coefficient of thermal expansion than the steel. The balancing of the stresses over the operational and non-operational range of conditions is suitably accomplished by pre-stressing the Inconel™ 690 steam generator tubes 32 by expanding the tubes 32 into mating holes of the upper and lower tubesheets 90, 92. This expansion draws the tubes into tension via the Poisson effect. In general, the concept is that in the operating state of the nuclear reactor the primary coolant flowing in the tubes 32 of the OTSG 30 is at a relatively high temperature, for example a temperature of at least 500° C., and the tubes 32 of the OTSG 30 are designed to be under axial compression in this operating state at high temperature. On the other hand, the tubes 32 of the OTSG 30 are designed to be under axial tension in a non-operating state of the nuclear reactor in which the tubes 32 are at a substantially lower temperature such as room temperature, for example suitably quantified as a temperature of less than 100° C. The balancing of the stresses over the operational and non-operational range is achieved by pre-stressing the tubes 32 to be in axial tension at room temperature (e.g., at less than 100° C. in some embodiments), so that the differential thermal expansion between the Inconel™ 690 steam generator tubes 32 and the steel of the central riser 36 and vessel 14 causes the tubes to transition from axial tension to axial compression as the temperature is raised to the operating temperature, e.g. at least 500° C. in some embodiments. These differential thermal stresses among components 14, 32, and 36 are set up by common connection of the components at the tubesheet supports 90, 92 is also optionally reduced by having the feedwater nozzle 50 positioned low in the pressure vessel leaving a longer steam outlet annulus 62 to blanket the vessel with high temperature outlet steam, and by reducing axial length of the feedwater annulus 60 by employing a larger radius for the feedwater annulus 60.

Figure 7:
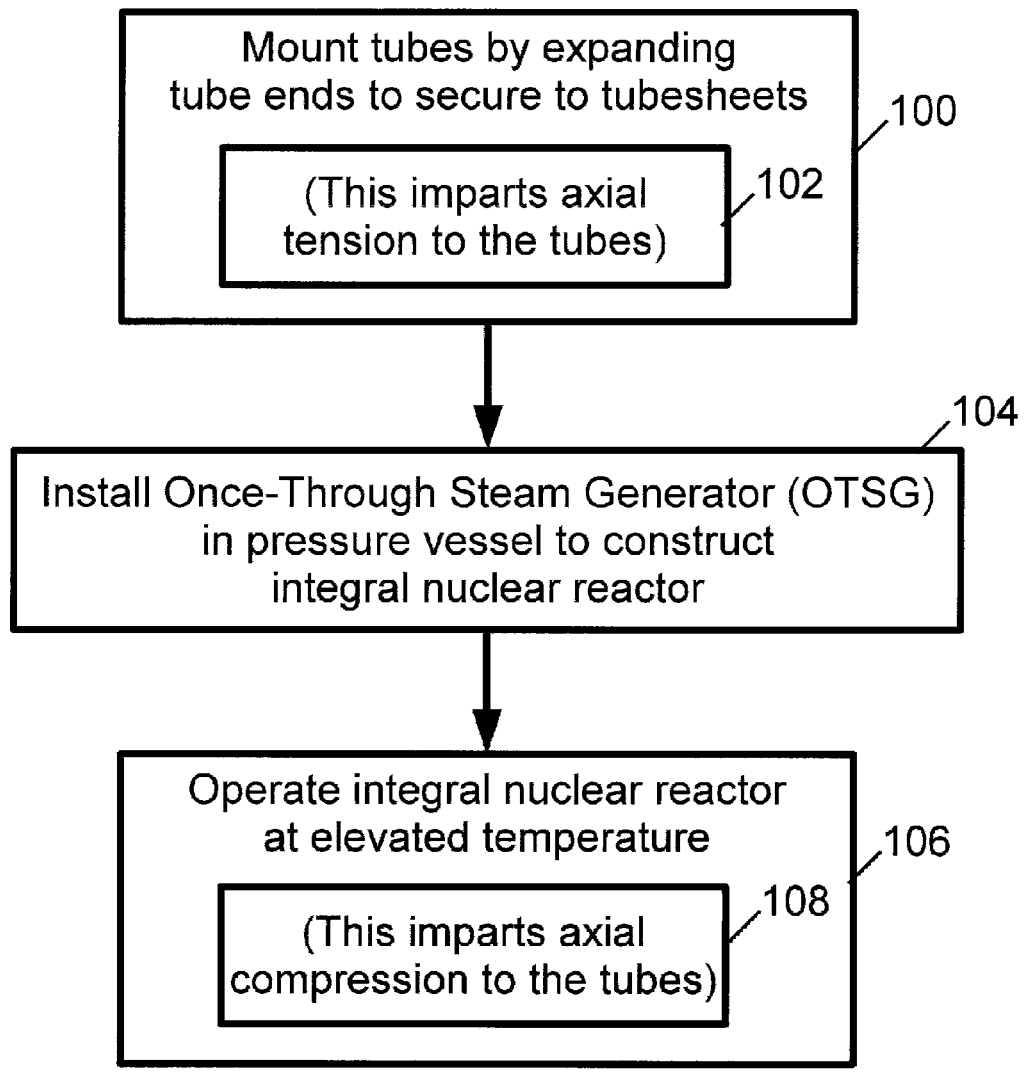
FIG. 7 diagrammatically shows an illustrative process for manufacturing and deploying the integral steam generator of FIG. 1.

With brief reference to FIG. 7, a manufacturing sequence to prestress the tubes 32 to place them into axial tension is further described. In an operation 100, the tubes 32 are mounted in the tubesheets 90, 92 of the OTSG frame or support by expanding the tube ends to secure them to the tubesheets 90, 92. A consequential operation 102 is that this imparts axial tension to the tubes 32. In an operation 104, the OTSG 30 including the prestressed tubes 32 is installed in the pressure vessel 12, 14, 16 to construct the integral PWR of FIGS. 1-5. In an operation 106, the integral PWR is started up and brought to its operating state which has the effect of raising the temperature the primary coolant flowing in the tubes 32 of the OTSG 30 to an operating temperature of (in the illustrative example) at least 500° C. A consequential operation 108 is that this imparts axial compression to the tubes 32 due to the relatively higher coefficient of thermal expansion of the austenitic nickel-chromium-based alloy of the tubes 32 as compared with the steel of the central riser 36 and vessel 14 connected via tubesheets 90, 92.

In some embodiments, in the operating state the OTSG 30 defines an integral economizer that heats feedwater injected into the fluid flow volume at the feedwater inlet 50 to a temperature at or below a boiling point of the feedwater. In such embodiments, the straight-tube OTSG 30 is an integral economizer (IEOTSG) design since the feedwater is heated by flow outside of the tubes 32. Feedwater enters through the feedwater nozzles 50, distributes throughout the feedwater annulus 60, and enters the tubes 32 via a gap or other passage (not shown) between the bundle shroud 40 and the lower tubesheet 92. In the operating mode, feedwater flows outside of the tubes 32 and there is forced convection heat transfer from the primary coolant flow to the feedwater flow followed by subcooled and saturated boiling to form the steam flow. Once the critical heat flux is reached at approximately 95% steam quality, the steam goes through a transition to stable film boiling followed by dryout at 100% steam quality. Thereafter in the tube bundle, the forced convection to steam raises the temperature to superheated conditions at which the steam exits the steam generator via the steam outlet annulus 62 and the steam outlet nozzle 52. The superheated steam does not require moisture separators before the steam is delivered to the steam turbine (although it is contemplated to include moisture separators in some embodiments). Some further aspects of the integral pressurizer are next described. The pressurizer controls the pressure of the primary coolant via the pressurizer heaters 82 and the pressurizer spray nozzles 84. To increase system pressure, the heaters 82 are turned on by a reactor control system (not shown). To decrease pressure, the spray nozzles 84 inject cold leg water from the top of the reactor inlet annulus 18 on the discharge side of the reactor coolant pumps 26 via a small external line (not shown). The pressurizer volume 80 is formed by a divider plate 70 which separates the space between the primary inlet plenum 74 and the pressurizer volume 80. The divider plate 70 optionally also serves as a flow diverter by including a perforated cylinder 124 (FIG. 8, top of divider plate not shown) or a cone shaped flow diverter surface 72 (FIG. 2) or other curved or slanted surface which aids in the turning of the flow in the primary coolant in the inlet plenum 74 before it enters the upper ends of the tubes 32 of the OTSG 30 setting up downward flow inside the tubes 30. The illustrative pressurizer including the pressurizer volume 80 and pressure control structures 82, 84 advantageously is a fully integral pressurizer (that is, is part of the pressure vessel 12, 14, 16) and advantageously has no pass-throughs for external CRDM's or other components.

The central riser 36 forms a path 38 for the primary coolant flow leaving the reactor core 10 to reach the primary inlet plenum 74 of the steam generator 30. In this embodiment there is no horizontal run of piping for this purpose. As a result, if the reactor is operated in a natural circulation mode with the reactor coolant pumps 26 turned off (as may occur during a malfunction or loss of electrical power causing the pumps 26 to stop operating), the hot rising primary coolant is only impeded by the upper internals (e.g., the CRDM's 24). This flow resistance is not large compared to the flow resistance of the core 10 and the steam generator tubes 32 because the flow area is relatively large. The flow resistance of the central riser 36 is also a relatively small percentage of the total because of the large diameter of the path 38. The large inlet 2608 and outlet 2610 of the coolant pumps 26 further reduces flow resistance.

In some existing nuclear steam supply systems, after a loss of coolant accident (LOCA) steam and non-condensable gases can collect at the high points of the reactor coolant pipes, and can inhibit the natural circulation loop between the reactor core and the steam generators. Advantageously, the straight-tube OTSG 30 with integral pressurizer volume 80 disclosed herein automatically removes non-condensable gases from the primary coolant circulation loop since there is only one high point at the top of the pressurizer volume 80. Buoyancy causes the non-condensable gases and vapor to go to the top of the pressurizer volume 80, where these gases and vapor do not interfere with the natural circulation loop.

Another advantage of the disclosed straight-tube OTSG 30 is that it can optionally operate in multiple modes to remove decay heat from the reactor core 10. Starting with the normal operating state, if the reactor coolant pumps 26 stop operating, then the primary coolant water continues to circulate, albeit now via natural circulation, through the core 10 and through the steam generator tubes 32. As long as there is feedwater supplied to the inlet 50 of the steam generator 30, there is a large tube surface area to remove radioactive fission product heat from the core 10. If the primary coolant level falls below the level of the primary inlet plenum 74 during a LOCA, then the straight-tube OTSG 30 can operate as a condenser. In this mode, steam from boiling water in the reactor core 10 rises to fill the primary inlet plenum 74 and the pressurizer volume 80. The lower temperature water and steam on the secondary side (that is, in the fluid flow volume defined outside the tubes 32 by the shrouds 40, 42) causes condensation inside the steam generator tubes 30. By gravity alone, the condensate flows out of the steam generator tubes 32 into the primary outlet plenum 44 where it is returned to the core 10.

In the straight-tube OTSG 30, the primary coolant pressure is inside the tubes 32. The primary coolant is at a substantially higher pressure than the secondary coolant flowing through the fluid flow volume defined outside the tubes 32 by the shrouds 40, 42. In some embodiments, in the operating state of the nuclear reactor the primary coolant flowing inside the tubes 32 is at a pressure that is at least twice a pressure of the secondary fluid (feedwater or steam) in the fluid flow volume. This enables the use of a thinner tube wall in tension. In contrast, if the primary coolant flows outside the tubes then the tube is in compression and a thicker tube wall is generally required. Some analyses have indicated that the tube wall in the tension design of the present OTSG embodiments can be made about one-half as thick as the tube wall thickness required for tubes placed in compression (for comparable tube diameter).

The use of thinner tube walls translates into the OTSG 30 being substantially lighter and including substantially less Inconel™ 690 or other nickel-chromium-based alloy material used for the tubes 32. The weight saving of the straight-tube OTSG 30 is advantageous for an integral nuclear reactor. For example, in the illustrative embodiment of FIGS. 1-3, during refueling the core 10 is accessed by removing the steam generator 30. This entails disconnecting the OTSG 30 from the lower pressure vessel portion 12 via the mid-flange 16. The lightweight straight-tube OTSG 30 advantageously reduces the requisite size of the containment structure crane used for lifting the steam generator 30 off to the side during refueling. Advantageously, the illustrative internal primary coolant pumps 26 are located peripherally in the reactor inlet annulus 18 surrounding the reactor core 10, and so the pumps 26 do not need to be removed to perform the refueling.

The straight-tube OTSG 30 also has service and maintenance advantages. Manways are readily provided proximate to the pressurizer volume 80 and the primary inlet plenum 74 to provide service access. Inspection of the tubes 32 can be performed during a plant outage via the primary inlet plenum 74 without removing the steam generator 30 from the pressure vessel. Eddy current inspection thusly performed can reveal tube thinning and tube cracks. If tube plugging is indicated by such inspection, the steam generator 30 can be removed during the outage and tube plugs can be installed at the lower tubesheet 92 and the upper tubesheet 90. In another approach, both tube inspection and tube plugging can be done during refueling when the steam generator 30 is placed off to the side of the reactor. In this case, there is easy access from the bottom for tube inspection and plugging.

With reference back to FIG. 4, in the illustrative embodiment the steam generator 30 is a OTSG with straight tubes 32, and primary coolant $F_{primary}$ flows inside the tubes 32 of the steam generator 30 while the secondary coolant (water $F_{secondary}$ or steam $S_{secondary}$) flows in the opposite direction outside of the tubes 32. As discussed herein, there are substantial advantages to this configuration. However, it is also contemplated to employ a flow configuration in which the primary coolant flows outside the tubes and the secondary coolant flows inside the tubes. Since the internal primary coolant pumps 26 are not coupled with the steam generator 30, using such a variant flow configuration would not entail modification of the pumps 26 or their location in the pressure vessel. Moreover, it is additionally or alternatively contemplated to replace the vertical tubes 32 of the illustrative OTSG 30 with slanted tubes, or with one or more helical tubes forming a helix around the central riser 36, or so forth.

Figure 8:
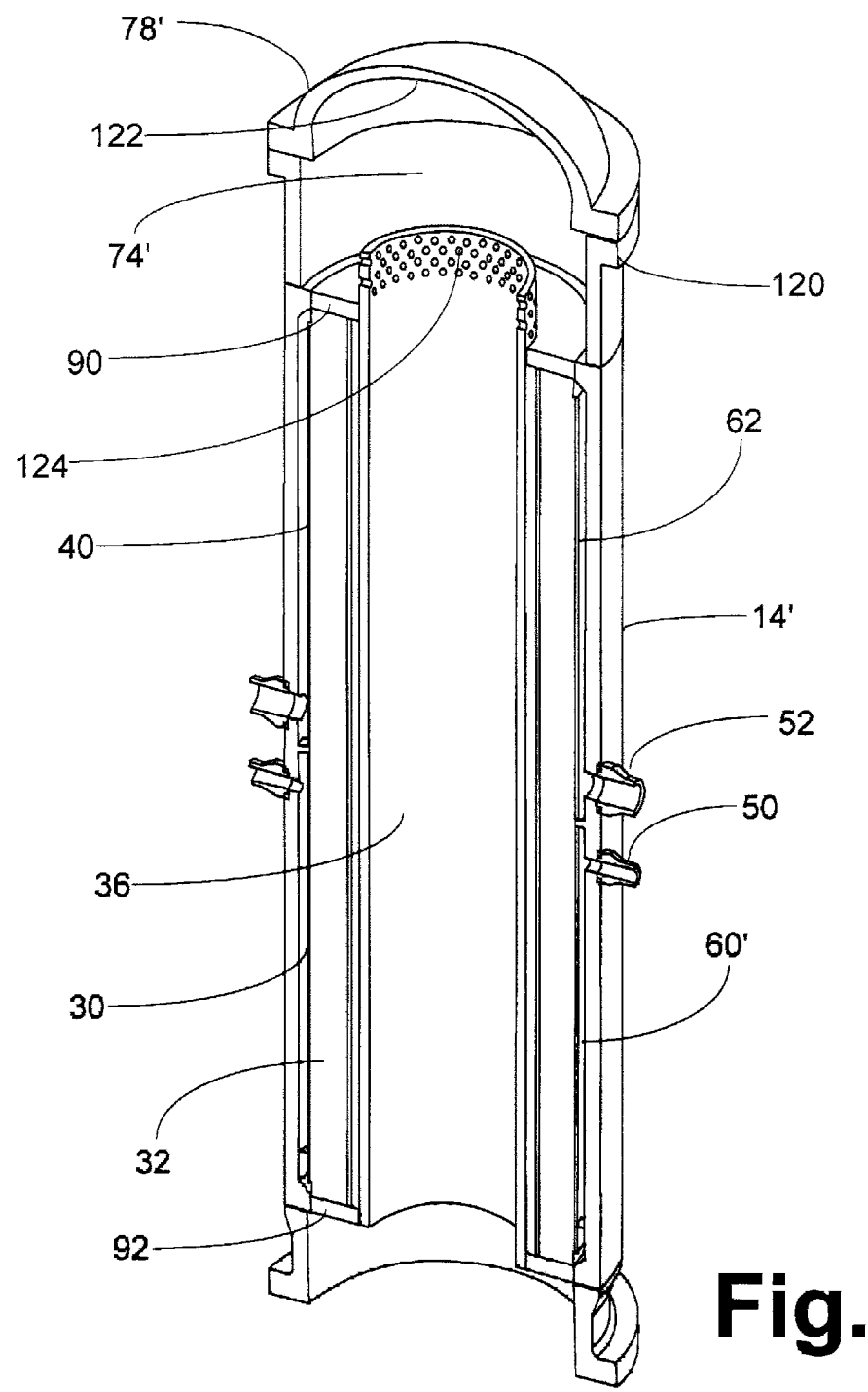
FIG. 8 diagrammatically illustrates the upper pressure vessel portion of a variant embodiment.

With reference to FIG. 8, a variant embodiment is described. This variant embodiment includes the IEOTSG 30 with tubes 32 mounted in upper and lower tubesheets 90, 92. In this variant embodiment, a modified upper pressure vessel portion 14' differs from the upper pressure vessel portion 14 in that it does not have a larger diameter to provide a feedwater annulus with larger outer diameter as compared with the steam annulus. Rather, a feedwater annulus 60' connected with the feedwater inlet 50 in the variant embodiment of FIG. 8 is of the same outer diameter as the steam annulus 62 that is connected with the steam outlet 52. The modified upper pressure vessel portion 14' also differs from the upper pressure vessel portion 14 in that it does not include the integral sealing top portion 78. Rather, a separate sealing top portion 78' is provided which is secured to the modified upper pressure vessel portion 14' by an upper flange 120. Still further, the variant embodiment also does not include an integral pressurizer volume or the diverter plate 70. Rather, the sealing top portion 78' defines a modified primary inlet plenum 74' (but does not define a pressurizer volume), and the sealing top portion 78' includes a curved surface 122 that cooperates with cylinder openings 124 at the top of the central riser 36 to perform the primary coolant flow diversion functionality.

As the pressurizer volume 80 of the embodiment of FIGS. 1-3 is omitted in the variant embodiment of FIG. 8, primary coolant pressurization for the embodiment of FIG. 8 is suitably provided by self-pressurization. In this approach, steam vapor from the reactor core collects at the top of the steam generator vessel, that is, in the primary inlet plenum 74'. The compressibility of the vapor filled dome volume 74' regulates the primary coolant pressure. To increase power, the feedwater flow into the feedwater inlet 50 is increased which increases the boiling lengths in the tubes 32. The reactor core 10 follows the load demand by increasing power via a negative moderator coefficient of reactivity due to the reduction in core inlet temperature from the steam generator 30. The core outlet temperature is maintained at a near constant temperature regulated by the pressure and saturation temperature of the steam dome volume 74'. Accordingly, for an increase in power, the temperature rise across the reactor core 10 increases while the reactor flow rate remains constant as determined by the reactor coolant pumps 26. Decreasing power employs analogous processes.

As another illustrative variation (not shown), the tubes of the OTSG can be placed in different locations within the pressure vessel. In the illustrative embodiments of FIGS. 1-3 and 8, the OTSG 30 including tubes 32 is disposed entirely in the downcomer volume 34. More generally, however, tubes may be disposed in the downcomer volume (as illustrated), or in the central riser flow path 38 inside the central riser 36, or in both volumes 34, 36.

As other illustrative variations, it has already been noted that the separate inner shroud 42 may instead be embodied as an outer surface of the central riser 36, and/or for the separate outer shroud 40 may instead be embodied as an inner surface of the upper portion 14 of the pressure vessel. Additionally, it is contemplated to integrate the lower tubesheet 92 with the mid-flange 16.

With reference back to FIG. 5, another disclosed aspect is the use of a vertically staggered arrangement of the individual CRDM units 24. In illustrative FIG. 5, CRDM units are variously located with tops at different vertical levels L1-L4, with no two immediately neighboring CRDM units at the same vertical level. Another illustrative example, in which the CRDM units are staggered between only two vertical levels, is shown in application Ser. No. 12/722,696 filed Mar. 12, 2010 and titled "Control Rod Drive Mechanism for Nuclear Reactor". Another way of stating this is that the CRDM units are staggered at two or more different distances from the nuclear reactor core such that no two neighboring CRDM units are at the same distance from the nuclear reactor core. In general, by staggering the CRDM units so that any two adjacent or neighboring CRDM units are not at the same vertical level or height, a more compact CRDM unit array is achieved as compared with conventional arrangements in which all CRDM units are at the same vertical level or height.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
   a generally cylindrical pressure vessel defining a cylinder axis, the generally cylindrical pressure vessel comprising a sealing top portion, an upper vessel portion, and a lower vessel portion;
   a nuclear reactor core disposed in the lower vessel portion of the generally cylindrical pressure vessel;
   a steam annulus,
   a feedwater annulus,
   a central riser disposed coaxially inside the upper vessel portion of the generally cylindrical pressure vessel, the central riser being hollow and having an end proximate to the nuclear reactor core to receive primary coolant heated by the nuclear reactor core and an open end distal from the nuclear reactor core discharging the primary coolant;
   a once-through steam generator (OTSG) comprising a plurality of tubes arranged parallel with the central riser and disposed in an annular volume defined between the central riser and the upper vessel portion of the generally cylindrical pressure vessel, the primary coolant discharged from the open end of the central riser flowing through the OTSG and heating secondary coolant also flowing through the OTSG, the primary coolant and the secondary coolant being disposed in separate flow paths in the OTSG;
   neutron-absorbing control rods; and
   an internal control rod drive mechanism (CRDM) configured to controllably insert and withdraw the control rods into and out of the nuclear reactor core, the internal CRDM having all mechanical and electromagnetomotive components including at least a motor and a lead screw disposed inside the lower vessel portion of the pressure vessel.

2. The apparatus as set forth in claim 1, wherein the internal CRDM is non-integral with the generally cylindrical pressure vessel and disposed between the OTSG and the nuclear reactor core.

3. The apparatus as set forth in claim 1, wherein the generally cylindrical pressure vessel is vertical with its cylinder axis oriented vertically, and the internal CRDM is disposed below the OTSG in the vertical pressure vessel.

4. The apparatus as set forth in claim 3, further comprising:
   internal primary coolant pumps arranged to circulate primary coolant within the pressure vessel, the internal primary coolant pumps having all mechanical and electromagnetomotive components including at least a motor and at least one impeller disposed inside the lower vessel portion of the pressure vessel, the internal primary coolant pumps arranged below the OTSG to receive primary coolant discharged from the OTSG.

5. The apparatus as set forth in claim 4, wherein the internal primary coolant pumps are disposed peripherally around the internal CRDM.

6. The apparatus as set forth in claim 5, wherein a vertical height of the internal primary coolant pumps in the lower vessel portion of the vertical pressure vessel overlaps a vertical height range of the internal CRDM.

7. The apparatus as set forth in claim 3, wherein the internal CRDM comprises a plurality of CRDM units that are staggered at two or more different vertical heights such that no two neighboring CRDM units are at the same vertical height.

8. The apparatus as set forth in claim 1, wherein the internal CRDM comprises a plurality of CRDM units that are staggered at two or more different distances from the nuclear reactor core such that no two neighboring CRDM units are at the same distance from the nuclear reactor core.

9. The apparatus as set forth in claim 1, wherein a portion of the open end of the central riser extends vertically beyond the top elevation of the OTSG and further comprises a plurality of perforations.

10. The apparatus as set forth in claim 4, wherein the internal primary coolant pumps are arranged above the nuclear reactor core and wholly immersed in primary coolant.

11. The apparatus as set forth in claim 1, wherein a portion of the feedwater annulus has a larger diameter than the steam annulus.

12. The apparatus as set forth in claim 1, wherein the steam annulus is located above the feedwater annulus.

* * * * *

UNITED STATES PATENT AND TRADEMARK OFFICE
CERTIFICATE OF CORRECTION

PATENT NO.         : 9,177,674 B2
APPLICATION NO.    : 12/911572
DATED              : November 3, 2015
INVENTOR(S)        : Malloy et al.

Page 1 of 1

It is certified that error appears in the above-identified patent and that said Letters Patent is hereby corrected as shown below:

In the Specification
Column 2, line 67, please change "a illustrative" to -- an illustrative --
Column 7, line 20, please change "indicate path" to -- indicated path --
Column 7, line 25, please change "terminates at in the" to -- terminates at the --
Column 7, line 52, please change "26 in intack" to -- 26 in tack --
Column 8, line 7, please change "be mounted" to -- can be mounted --
Column 9, line 10, please change "circuit-for" to -- circuit, for --
Column 11, line 65, please change "tubes 30." to -- tubes 32. --
Column 12, line 14, please change "care 10" to -- core 10 --

Signed and Sealed this
Seventeenth Day of May, 2016

Michelle K. Lee
*Director of the United States Patent and Trademark Office*